United States Patent [19]

Mansson et al.

[11] 4,245,463

[45] Jan. 20, 1981

[54] GAS TURBINE PLANT

[75] Inventors: Martin Mansson; Ragnar Torstenfelt, both of Finspong, Sweden

[73] Assignee: Stal-Laval Turbin AB, Vesteras, Sweden

[21] Appl. No.: 28,619

[22] Filed: Apr. 9, 1979

[30] Foreign Application Priority Data

Apr. 11, 1978 [SE] Sweden ................................ 7804024

[51] Int. Cl.$^3$ ................................................ F02C 7/26
[52] U.S. Cl. ........................... 60/39.14 M; 60/39.46 S
[58] Field of Search ........ 60/39.46 R, 39.13, 39.14 R, 60/39.14 M, 39.12, 39.07, 39.46 S; 122/5; 431/6, 7

[56] References Cited

U.S. PATENT DOCUMENTS

| 730,782 | 6/1903 | Morrison | 60/39.46 S X |
| 2,262,195 | 11/1941 | Noack | 60/39.14 R X |
| 2,465,464 | 3/1949 | Meyer | 60/39.46 R |
| 3,914,089 | 10/1975 | Desty et al. | 431/7 |

Primary Examiner—Jerry W. Myracle
Attorney, Agent, or Firm—Pollock, Vande Sande & Priddy

[57] ABSTRACT

A gas turbine plant having an ignition combustion chamber for applying heated gas to heat the fluidized bed material to ignition temperature. In starting up the plant, a starter motor is employed to rotate a turbine and thereby to cause a compressor to produce compressed air. Liquid or gaseous fuel is applied to the ignition combustion chamber and is ignited within the chamber to heat compressed air from the compressor. The compressed air is passed through the fluidized bed combustor to heat the bed material up to ignition temperature. During the start-up operation, bed material in the fluidized bed combustor is reduced to reduce the pressure requirements for the heated compressed air.

5 Claims, 1 Drawing Figure

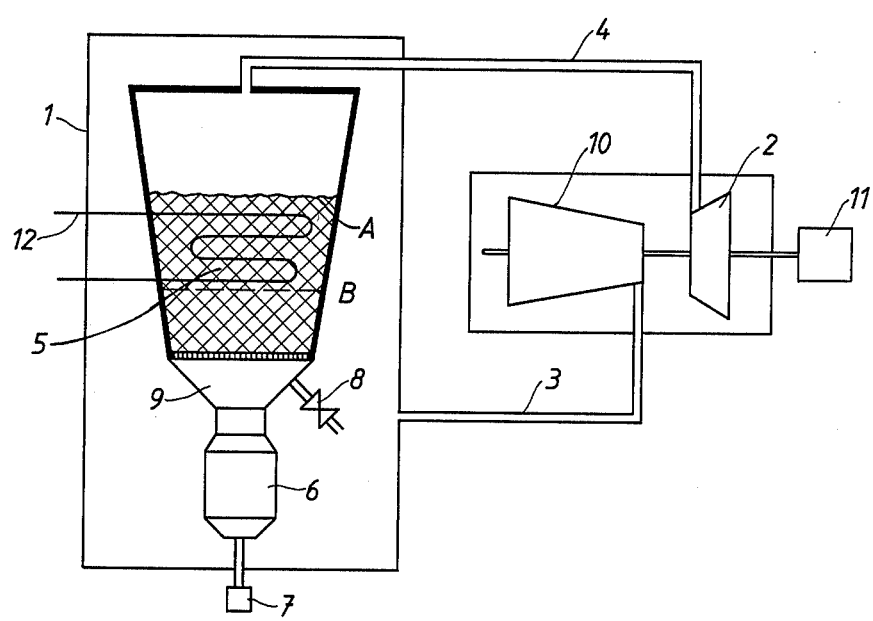

GAS TURBINE PLANT

BACKGROUND OF THE INVENTION

The invention relates to a gas turbine plant, and, more particularly, to such a plant including starter means for igniting the fuel in a fluidized bed combustor to drive a turbine under load.

It is known to heat the fuel in a fluidized bed combustor to an ignition temperature and to utilize the combustion gases from the fluidized bed to drive a turbine under load. However, in order to initially start such a turbine system, it is often necessary to utilize an auxiliary heating apparatus to initially apply heat to the fluidized bed material to bring it to ignition temperature. At that stage fuel can be added to the fluidized bed and the combustion can start working. Such auxiliary heating apparatus may be fairly cumbersome and inefficient in operation.

Accordingly, it is an object of the invention to provide a simple and effective means for applying heat to a fluidized bed combustor in a gas turbine plant to start the plant in operation.

A further object of the invention is to provide such an ignition combustion means wherein compressed air is heated in an ignition combustion chamber and is passed through a fluidized bed combustor for heating the bed material to a temperature high enough to ignite the fuel when it is added.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the gas turbine plant, according to the invention, includes a gas turbine that is connected to a compressor that produces compressed air when the turbine is rotated. The compressed air is passed through a conduit to the interior of a pressure casing that encloses a combustion chamber having a fluidized bed combustor and a distribution chamber that is connected at the lower end of the combustion chamber. A valve is provided to pass compressed air from the interior of the pressure casing to the interior of the distribution chamber. The distribution chamber directs the compressed air to the combustion chamber.

An ignition combustion chamber is connected to the distribution chamber and is disposed at least partially within the pressure casing. The ignition combustion chamber has holes or air ports on its sides to receive compressed air from the interior of the pressure casing and to pass the compressed air to the distribution chamber and, hence, to the combustion chamber.

In order to start up the gas turbine plant, a starter motor is activated to rotate the gas turbine and thereby operate the compressor to produce compressed air. A combustible ignition fuel is then applied to the ignition combustion chamber and is ignited within the ignition combustion chamber so that the compressed air passing through the chamber is heated. The heated air then passes through the distribution chamber and is forced up through the fluidized bed to heat the bed material to an ignition temperature of the fuel when added.

When the fluidized bed reaches the ignition temperature, combustible fuel is applied to the fluidized bed to maintain the combustion and additional compressed air is supplied to the bed through the valve of the distribution chamber to support combustion and to thereby drive the turbine under load conditions. The starter motor is then turned off and the ignition fuel supply is cut off to stop the combustion in the ignition combustion chamber.

During the start-up operation, the level of the fluidized bed may be reduced to reduce the pressure requirements for passing heated air through the fluidized bed.

BRIEF DESCRIPTION OF THE DRAWINGS

The FIGURE shows a diagrammatic representation of a gas turbine plant according to the invention.

DETAILED DESCRIPTION OF PREFERRED EMBODIMENTS

The remaining portion of this specification will describe preferred embodiments of the invention when read in conjunction with the attached drawings, in which like reference characters identify identical apparatus.

The FIGURE illustrates a gas turbine plant according to the invention. The plant includes a turbine 2 that drives a compressor 10 for producing compressed air. The compressor 10 is connected to a pressure casing 1 by means of a conduit 3. A combustion chamber is disposed within the volume defined by the pressure casing 1 and contains a fluidized bed 5 of crushed limestone and coal ash.

The compressed air from the compressor is passed through the conduit 3 to the pressure casing 1 and the compressed air in the pressure casing is passed through a valve 8 to a distribution chamber 9 that connects with the fluidized bed 5. The compressed air passes through the ignited fluidized bed to support the combustion of the fuel in the bed and pressurized combustion gases are passed through a conduit 4 to operate the turbine.

In order to start the combustion process, the fluidized bed must first be heated to an ignition temperature, for example 700° C. Thus, in order to start the plant, a starting motor 11 is provided to initially operate the turbine and to thereby generate compressed air that is passed to the pressure casing 1. During the start-up process the valve 8 is closed or operated in a reduced air flow position and an ignition combustion chamber 6 is supplied at 7 with a liquid or gaseous fuel that is ignited to begin heating the fluidized bed to its ignition temperature.

The ignition combustion chamber 6 is provided with holes or air ports on its sides to allow at least a portion of the compressed air at the inside of the pressure casing 1 to pass into the ignition combustion chamber and to thereby support the combustion of the liquid or gaseous ignition fuel. The heated gases from the ignition combustion chamber 6 are directed by the distribution chamber 9 to pass through the fluidized bed and to thereby heat the bed material. It should be understood that after the fluidized bed is ignited, the flow of fuel to the ignition combustion chamber 6 may be cut off to stop the combustion in the chamber 6 and combustible fuel, for example crushed coal, may be supplied to the fluidized bed 5 to maintain the combustion of the bed. Also, once the fluidized bed has been ignited, the valve 8 may be opened to supply additional compressed air in order to control the combustion of the bed and to thereby provide a power level for the turbine.

It is advantageous to maintain the height of the fluidized bed 5 at a reduced level, for example position B, during the ignition process in order to reduce the amount of air that must pass through the bed. Due to the reduced air requirement for the ignition process, a relatively smaller starter motor 11 may be used. Also, if the fluidized bed is used as a heat exchanger in a combined plant, for example a gas-steam turbine plant, the reduced ignition level of the bed should be below corresponding heat exchanger tubes 12 to ensure that less heat is carried away by the tubes 12 during the ignition process. Of course, once the fluidized bed is ignited, the level of the bed may be raised to a higher operational height, for example position A.

Although the valve 8 is shown symbolically in the drawing, it should be understood that such a valve may include a plurality of valves having considerably larger area than the air openings on the ignition combustion chamber 6. In this way the valve 8 may be adjusted to provide a correct amount of air for the ignition process and for increasing the rate of combustion of the fluidized bed for normal loaded operation of the turbine.

In the figure, the ignition combustion chamber 6 is located immediately below the air distribution chamber 9, thereby providing a symmetrical and practical construction. However, the ignition combustion chamber may be located at other positions, for example at the side of the fluidized bed 5. Those skilled in the art will appreciate that the compressor turbine unit shown in the drawing may be employed to drive a power generator or may be included in a gas generator plant for a separate power turbine (not shown).

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A gas turbine plant comprising:
   a gas turbine;
   compressor means operatively associated with said turbine for generating compressed gas;
   combustion chamber means for containing a fluidized bed combustor;
   starter motor means for rotating said compressor means during an initial starting period;
   pressure casing means enclosing said combustion chamber means and defining a volume between said combustion chamber means and said pressure casing means, said pressure casing means being connected to said compressor means for receiving said compressed gas into said volume;
   distribution means connected to said combustion chamber means and disposed within said pressure casing means for receiving said compressed gas from said volume and passing it to said fluidized bed combustor;
   ignition combustion chamber means connected to said distribution means and at least partially disposed within said pressure casing means for receiving at least a portion of said compressed gas from said volume, said ignition combustion chamber means being supplied with ignition fuel and operable to apply heated compressed gas during said starting period for igniting the fuel in said fluidized bed combustor; and
   means connecting said combustion chamber means to said gas turbine for applying combustion gases to rotate said gas turbine.

2. A gas turbine plant according to claim 1 wherein said ignition combustion chamber means is located below said distribution means.

3. A gas turbine plant according to claim 2 wherein said distribution means includes a valve means for passing compressed gas from said volume defined by said pressure casing means to said fluidized bed combustor, the compressed gas from said ignition combustion chamber means and the compressed gas from said valve means supporting combustion in said fluidized bed combustor.

4. A gas turbine plant comprising:
   a gas turbine;
   compressor means operatively associated with said turbine for generating compressed gas;
   combustion chamber means for containing a fluidized combustor;
   starter motor means for rotating said compressor means during an initial starting period;
   pressure casing means enclosing said combustion chamber means and defining a volume between said combustion chamber means and said pressure casing means, said pressure casing means being connected to said compressor means for receiving said compressed gas into said volume;
   distribution means connected to said combustion chamber means and disposed within said pressure casing means for receiving said compressed gas from said volume and passing it to said fluidized bed combustion;
   ignition combustion chamber means located below and connected to said distribution means and at least partially disposed within said pressure casing means for receiving at least a portion of said compressed gas from said volume, said ignition combustion chamber means being supplied with ignition fuel and operable to apply heated compressed gas during said starting period for igniting fuel in said fluidized bed combustion; and
   means connecting said combustion chamber means to said gas turbine for applying combustion gases to rotate said gas turbine.

5. A gas turbine plant according to claim 4, wherein said distribution means comprises valve means for passing compressed gas from said volume defined by said pressure casing means to said fluidized bed combustor to support combustion therein.

* * * * *